(12) United States Patent
Burns et al.

(10) Patent No.: US 7,543,872 B1
(45) Date of Patent: Jun. 9, 2009

(54) SLIDABLE CARGO BAY SYSTEM

(76) Inventors: Scott M. Burns, P.O. Box, Blowing Rock, NC (US) 28605; John E. Sciullo, 28031 Eastbrook Dr., Bonita Springs, FL (US) 34135

( * ) Notice: Subject to any disclaimer, the term of this patent is extended or adjusted under 35 U.S.C. 154(b) by 279 days.

(21) Appl. No.: 11/546,194

(22) Filed: Oct. 11, 2006

(51) Int. Cl.
  *B62D 33/03* (2006.01)
(52) U.S. Cl. .............. 296/26.09; 296/37.14; 296/37.16; 296/26.08
(58) Field of Classification Search ................ 296/37.1, 296/37.8, 37.14, 37.16, 26.01, 26.08, 26.09; 214/83.24; 224/403, 542
  See application file for complete search history.

(56) References Cited

U.S. PATENT DOCUMENTS

| | | | | |
|---|---|---|---|---|
| 4,305,695 A | * | 12/1981 | Zachrich | .................... 296/37.1 |
| 6,065,792 A | * | 5/2000 | Sciullo et al. | ............ 296/26.09 |
| 6,120,075 A | * | 9/2000 | Terry | ....................... 296/26.09 |
| 6,390,525 B2 | * | 5/2002 | Carpenter et al. | ........ 296/26.09 |
| 6,398,283 B1 | * | 6/2002 | Knudtson et al. | ........ 296/26.09 |
| 2002/0005648 A1 | * | 1/2002 | Carpenter et al. | ........ 296/26.09 |
| 2005/0161964 A1 | * | 7/2005 | Adleman | .................. 296/26.09 |
| 2006/0145498 A1 | * | 7/2006 | Bartos et al. | ............. 296/26.09 |

* cited by examiner

Primary Examiner—Lori L Lyjak
(74) Attorney, Agent, or Firm—Edward P Dutkiewicz (57) ABSTRACT

A vehicle cargo slide system comprising a forward cross-member, a side member, and a rearward cross-member is coupled to a cargo bay floor. A platform, having a generally rectilinear configuration, is coupled to the members. The platform slides forward and rearward.

14 Claims, 5 Drawing Sheets

SLIDABLE CARGO BAY SYSTEM

BACKGROUND OF THE INVENTION

1. Field of the Invention

The present invention relates to a slidable cargo bay system and more particularly pertains to a new way to handle cargo.

2. Description of the Prior Art

The use of other ways of handling cargo comprising old and expected configurations is known in the prior art. More specifically, other ways of handling cargo comprising old and expected configurations previously devised and utilized for the purpose of handling cargo are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,065,792 issued to Sciullo et al on May 23, 2000 discloses a Slide-a-bed System for a truck. U.S. Pat. No. 7,040,643 issued to Eliades on May 9, 2006 discloses a Truck Bed Extension. U.S. Pat. No. 7,025,398 to Montagna et al on Apr. 11, 2006 discloses a Pull Out Drawer System. Lastly, U.S. Pat. No. 6,976,720 issued to Bequette on Dec. 20, 2005 discloses a Vehicle Sliding Floor Extension.

While these devices fulfill their respective, particular objectives and requirements, the aforementioned patents do not describe slidable cargo bay system that allows a new way to handle cargo.

In this respect, the slidable cargo bay system according to the present invention substantially departs from the conventional concepts and designs of the prior art, and in doing so provides an apparatus primarily developed for the purpose of providing a new way to handle cargo.

Therefore, it can be appreciated that there exists a continuing need for a new and improved slidable cargo bay system which can be used for loading and unloading cargo from commonly available vehicles. In this regard, the present invention substantially fulfills this need.

SUMMARY OF THE INVENTION

In view of the foregoing disadvantages inherent in the known types of other ways of handling cargo comprising old and expected configurations now present in the prior art, the present invention provides an improved slidable cargo bay system. As such, the general purpose of the present invention, which will be described subsequently in greater detail, is to provide a new and improved slidable cargo bay system and method which has all the advantages of the prior art and none of the disadvantages.

To attain this, the present invention essentially comprises a vehicle cargo slide system comprising several components, in combination.

First provided is a vehicle. The vehicle has a forward end and a rearward end. The vehicle also has a cargo bay comprising a floor having a forward portion and a rearward portion.

Next provided is a forward cross-member. The forward cross-member has a rearward side and a forward side with a thickness there between. The cross-member has a generally L-shaped configuration. The cross-member also has a plurality of attachment points. The forward cross-member is coupled to the floor of the cargo bay at the forward portion of the cargo bay.

Next provided is a pair of side members. Each of the side members runs in parallel with each other from the forward floor of the cargo bay to the rearward floor of the cargo bay of the vehicle. Each of the side members has at least one attachment point slot. Each of the side members has a generally C-shaped configuration with a top and a bottom forming a channel there between. The C-shaped configuration allowing the side members to mate with, hold, and contain an associated telescoping and extending weight-bearing rail. Each of the side members also has a weight-bearing rail stop located at the rearward end of each of the side members.

Next provided is a plurality of coupling straps. Each of the straps has a length, with an inward end and an outward end. Each of the straps has a hook at the inward end and an associated D ring and mounting tab located at the outward end of each of the straps. The hook is sized and configured to be received by and mate with the attachment slot of the side member.

Next provided is a rearward cross-member. The rearward cross-member comprises a length and has a rearward edge and a forward edge with a width there between. The rearward cross-member has a generally rectilinear shaped configuration with a pair of tab mounting holes located near the center of the length of the rearward cross-member.

Next provided is a lock attachment tab. The lock attachment tab has a generally L-shaped configuration. The shorter lower horizontal leg of the "L" has a pair of tab mounting holes there through. The perpendicular longer upright leg of the "L" has a lock mounting aperture there through.

Next provided is a lock. The lock has two components. The first lock component is coupled to the lock attachment tab.

Next provided is a platform. The platform has a generally rectilinear configuration with a forward edge and a rearward edge and two parallel side edges. The platform has an upper surface and a lower surface and a thickness there between. The upper surface comprises a contact surface and the lower surface comprises a mounting surface. The upper surface has an upwardly projecting peripheral rim coupled to the side edges and the forward edge of the platform. The lower surface has a downwardly projecting rim along the rearward edge of the platform. The downwardly projecting rim has a length and a lock aperture located near the center of the length of the downwardly projecting rim.

Next provided is a second lock component. The second lock component is coupled to the lock aperture of the downwardly projecting rim of the platform. The second lock component is configured to be received by and mated with the first lock component. The first lock component is coupled to the lock attachment tab. This configuration allows a user to lock the platform in place.

Next provided is a pair of platform attachment brackets. Each of the brackets has an inverted L-shaped configuration. The short horizontal leg of the L is located above the longer perpendicular and downwardly displaced leg of the L. Each of the horizontal legs is configured to be coupled to the mounting surface of the platform. Each of the downwardly displaced legs of the L is configured to be coupled with one of the weight-bearing rails.

Next provided is a pair of telescoping legs. Each of the telescoping legs has a generally square tubular configuration. Each leg has a first upper portion having a first internal dimension and a first length. Each leg also has a second lower portion having a second external dimension and a second length. The first dimension is larger than the second dimension. The first length is longer than the second length. This configuration allows the second lower portion to fit into, and be received by, the first upper portion.

Each of the second lower portions has a plurality of adjustment holes along its length. The first upper portion has an adjustment detent sized to mate with and hold the adjustment holes of the lower portion thereby allowing adjustment in overall length of the upper and lower portions when coupled. The first upper portion of each leg has a pivotable mounting aperture there through. There is a mounting bolt associated with each upper portion of the leg and the pivotable mounting aperture of the upper portion of each leg.

The upper portion of each leg has an associated leg lock. The leg lock has a generally C-shaped configuration. The leg lock has a pivoting hole and a holding slot there through. The leg lock has a recess sized to receive and mate with the outside dimension of the first upper portion of the leg and to hold the leg in a downward ground-engaging position.

Lastly provided is a leg holder. A leg holder is associated with each leg. The leg holder has a generally square, C-shaped configuration with a recess. The internal dimension of the recess is larger than the first external dimension of the upper portion of the telescoping leg so as to allow the leg to be nested within the leg holder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved slidable cargo bay system which has all of the advantages of the prior art including other ways of handling cargo comprising old and expected configurations and none of the disadvantages.

It is another object of the present invention to provide a new and improved slidable cargo bay system which may be easily and efficiently manufactured and marketed.

It is further object of the present invention to provide a new and improved slidable cargo bay system which is of durable and reliable constructions.

An even further object of the present invention is to provide a new and improved slidable cargo bay system which is susceptible of a low cost of manufacture with regard to both materials and labor, and which accordingly is then susceptible of low prices of sale to the consuming public, thereby making such slidable cargo bay system economically available to the buying public.

Even still another object of the present invention is to provide a slidable cargo bay system for a new way to handle cargo.

Lastly, it is an object of the present invention to provide a new and improved vehicle cargo slide system comprising a forward cross-member and at least one side member. The side and forward members have attachment points. A rearward cross-member couples to the side member. A platform is coupled thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
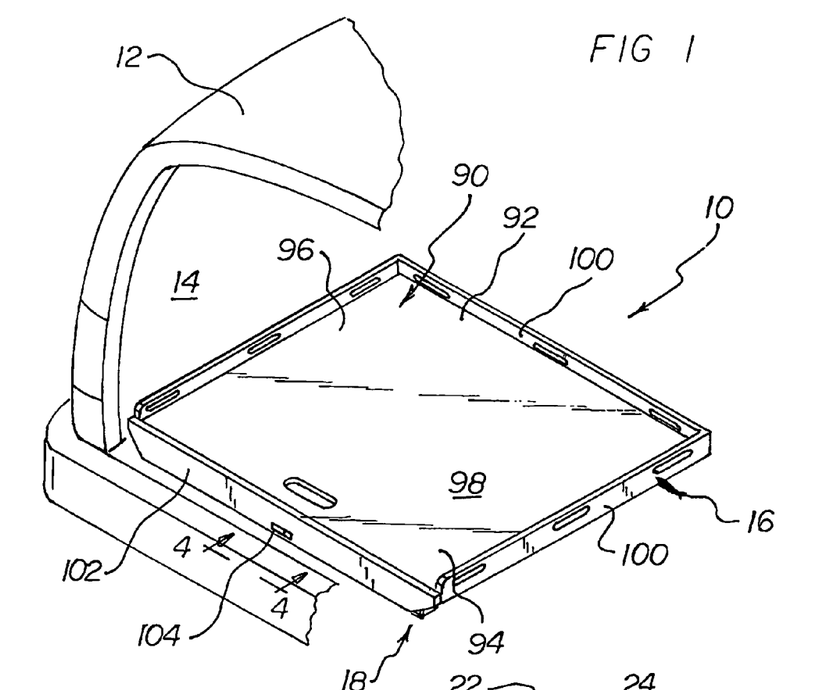
FIG. 1 is perspective view of a cut-away of a cargo bay of a vehicle, showing the system in place.

With reference now to the drawings, and in particular to FIG. 1 thereof, the preferred embodiment of the new and improved slidable cargo bay system embodying the principles and concepts of the present invention and generally designated by the reference numeral 10 will be described.

The present invention, the slidable cargo bay system 10 is comprised of a plurality of components. Such components in their broadest context include a forward cross-member, a pair of side members, a rearward member, and a platform. Such components are individually configured and correlated with respect to each other so as to attain the desired objective.

A vehicle cargo slide system 10 comprising several components, in combination.

First provided is a vehicle 12. The vehicle has a forward end and a rearward end. The vehicle also has a cargo bay 14 comprising a floor having a forward portion 16 and a rearward portion 18. The cargo bay has a central long axis that runs rearward to forward. The vehicle may be any one of a number of commonly available vehicles such as vans and sport utility vehicles (SUV's).

Next provided is a forward cross-member 20. The forward cross-member has a rearward side 22 and a forward side 24 with a thickness there between. The cross-member has a generally L-shaped configuration. The cross-member also has a plurality of attachment points 26. The forward cross-member is coupled to the floor of the cargo bay at the forward portion of the cargo bay. The forward cross-member is oriented perpendicular to the central long axis of the cargo bay of the vehicle. The coupling of the forward cross-member to the floor of the cargo bay may be achieved by any of the commonly known methods of fastening, such as adhesives, clips, pins, clamps, bolts, screws, latches, clips, wires or bands. In the preferred embodiment a plurality of straps are used to secure the forward cross-member to floor of the cargo bay.

In another embodiment there may be a single attachment utilized to secure the forward cross-member to the floor of the cargo bay of the vehicle.

Figure 5:
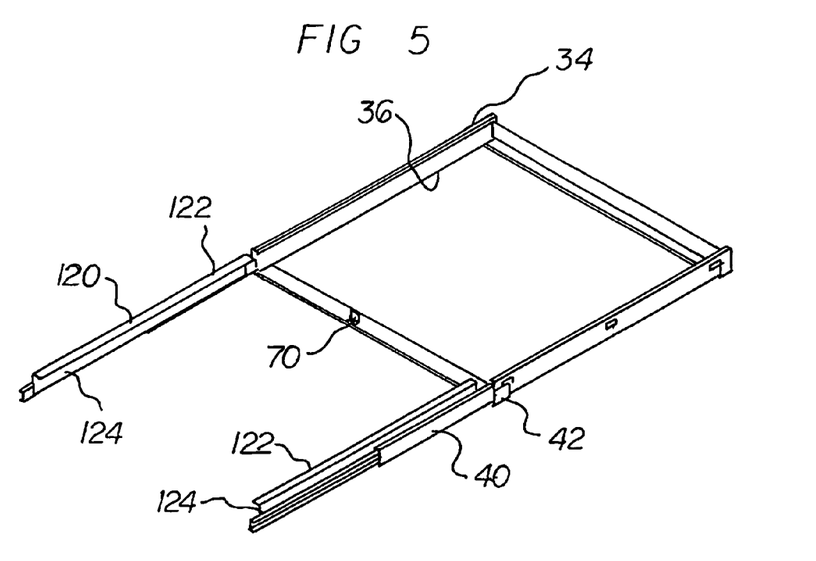
FIG. 5 is a perspective view showing the system without the platform in place.
Figure 6:
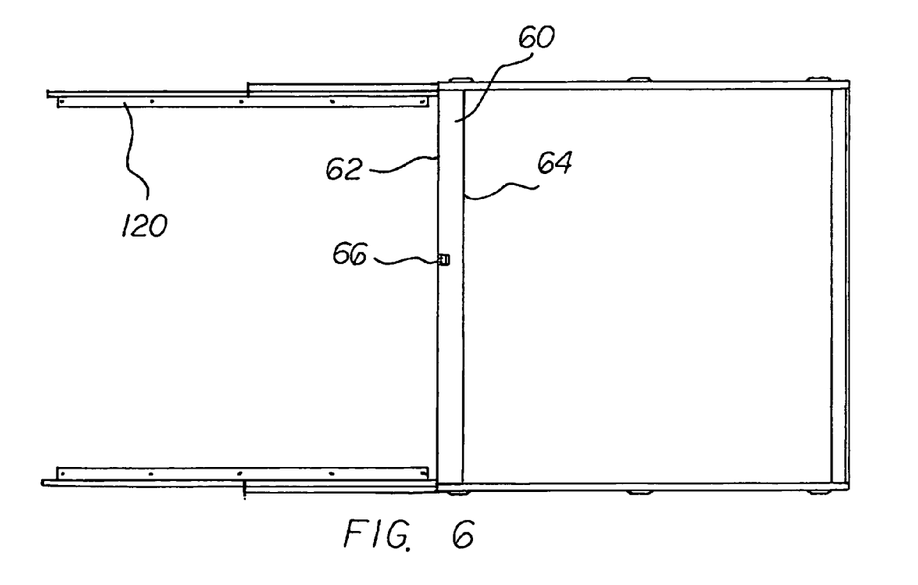
FIG. 6 is a planar overview of the system without the platform in place.

Next provided is a pair of side members 30. Each of the side members runs in parallel with each other from the forward floor of the cargo bay to the rearward floor of the cargo bay of the vehicle. The side members are oriented perpendicular to the forward cross-member and lie parallel with the central long axis of the cargo bay. Each of the side members has at least one attachment point slot 32. In the preferred embodiment there are multiple attachment point slots.

In other embodiments there may be a single point of attachment.

Each of the side members has a generally C-shaped configuration with a top 34 and a bottom 36 forming a channel there between. The C-shaped configuration allows the side members to mate with, hold, and contain an associated telescoping and extending weight-bearing rail 40. One skilled in the art would recognize that telescoping, extending weight bearing rails are commonly available and have been known in the art for many years. In the preferred embodiment a pair of parallel side members is utilized.

In other embodiments a single side member may be used instead of the pair of side members.

Each of the side members also has a weight-bearing rail stop 42 located at the rearward end of each of the side members.

Figure 3:
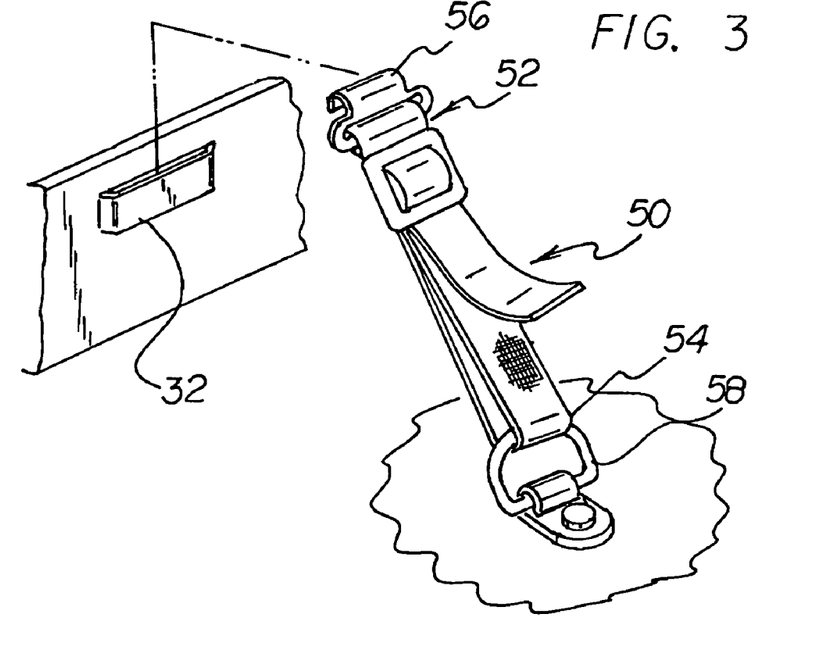
FIG. 3 is a close up of circle 3 of FIG. 2, showing a close-up view of the strap.

Next provided is a plurality of coupling straps 50. Each of the straps has a length, with an inward end 52 and an outward end 54. Each of the straps has a hook 56 at the inward end and an associated D ring 58 and mounting tab located at the outward end of each of the straps. The hook is sized and configured to be received by and mate with the attachment slot of the side member.

In the preferred embodiment the straps are adjustable, but one skilled in the art would recognize that the strap may be non-adjustable. The strap may be made of cloth or elastic material.

In another embodiment, the strap may be replaced by a clip, a snap, a hook and loop means, or a wire. Other fastening means such as turnbuckles, bolts, screws, springs, clips and clamps may also be used in place of a strap to fasten the system to the floor of a cargo bay.

In another embodiment the hook may be replaced by a wire, or a catch, or a latch, or any other type of fastener.

Next provided is a rearward cross-member 60. The rearward cross-member comprises a length and has a rearward edge 62 and a forward edge 64 with a width there between. The rearward cross-member has a generally flat rectilinear shaped configuration with a pair of tab mounting holes 66 located near the center of the length of the rearward cross-member.

Figure 7:
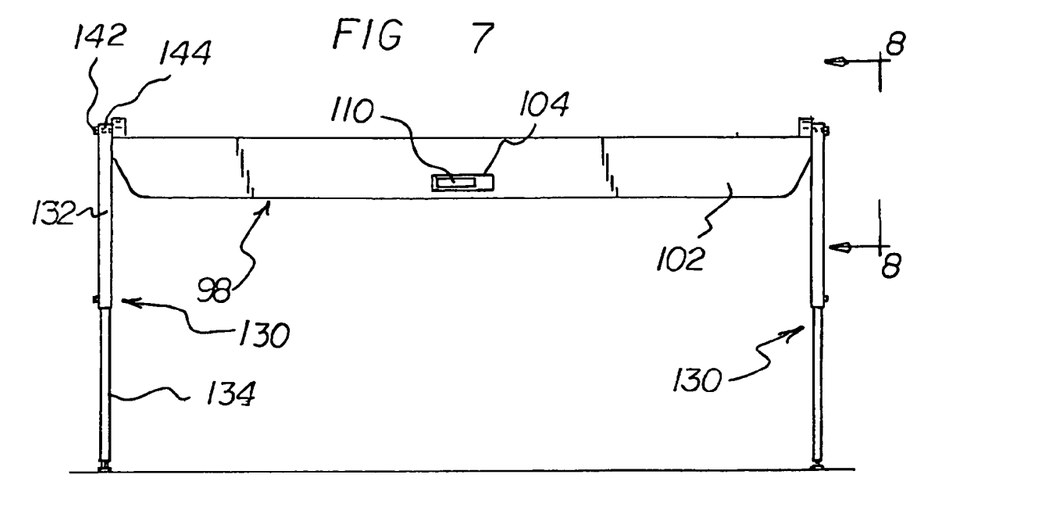
FIG. 7 is a rear elevation of the system.

Next provided is a lock attachment tab 70. The lock attachment tab has a generally L-shaped configuration. The shorter lower horizontal leg of the "L" 72 has a pair of tab mounting holes there through. The perpendicular longer upright leg of the "L" 74 has a lock mounting aperture 76 there through. The lock attachment tab may be coupled to the rearward cross-member by any one of the commonly used attachment means, such as bolts, screws, wires, rivets, clips, clamps, hooks, hook and loop attachment and snaps.

Next provided is a lock 80. The lock has two components. The first lock component 82 is coupled to the lock attachment tab.

Figure 2:
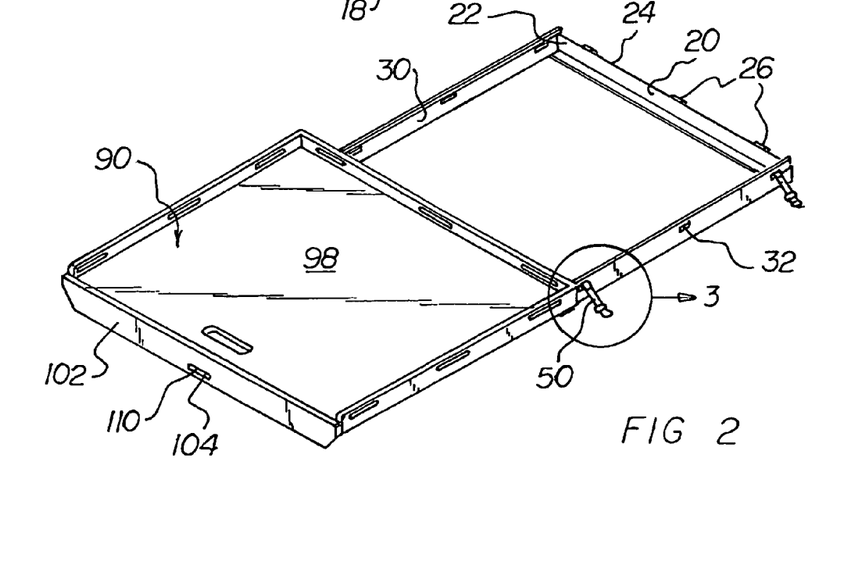
FIG. 2 is a perspective view of the system, showing the platform extended.

Next provided is a platform 90. The platform has a generally rectilinear configuration with a forward edge 92 and a rearward edge 94 and two parallel side edges 96. The platform has an upper surface 98 and a lower surface and a thickness there between. The upper surface comprises a contact surface and the lower surface comprises a mounting surface. The upper surface has an upwardly projecting peripheral rim 100 coupled to the side edges and the forward edge of the platform. The lower surface has a downwardly projecting rim 102 along the rearward edge of the platform. The downwardly projecting rim has a length and a lock aperture 104 located near the center of the length of the downwardly projecting rim.

Next provided is a second lock component 110. The second lock component is coupled to the lock aperture of the downwardly projecting rim of the platform. The second lock component is configured to be received by and mated with the first lock component. The first lock component is coupled to the lock attachment tab. This configuration allows a user to lock the platform into place.

Figure 4:
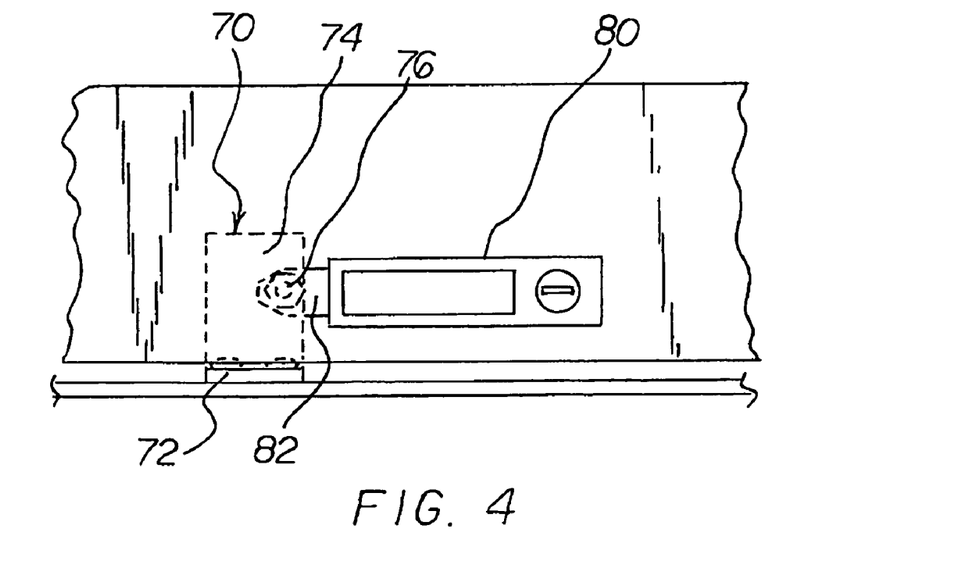
FIG. 4 is a view taken along line 4-4 of FIG. 1.

Next provided is a pair of platform attachment brackets 120. Each of the brackets has an inverted L-shaped configuration. The short horizontal leg of the "L" 122 is located above the longer perpendicular and downwardly displaced leg of the "L" 124. Each of the horizontal legs is configured to be coupled to the mounting surface of the platform. Each of the downwardly displaced legs of the L is configured to be coupled with one of the weight-bearing rails.

Figure 8:
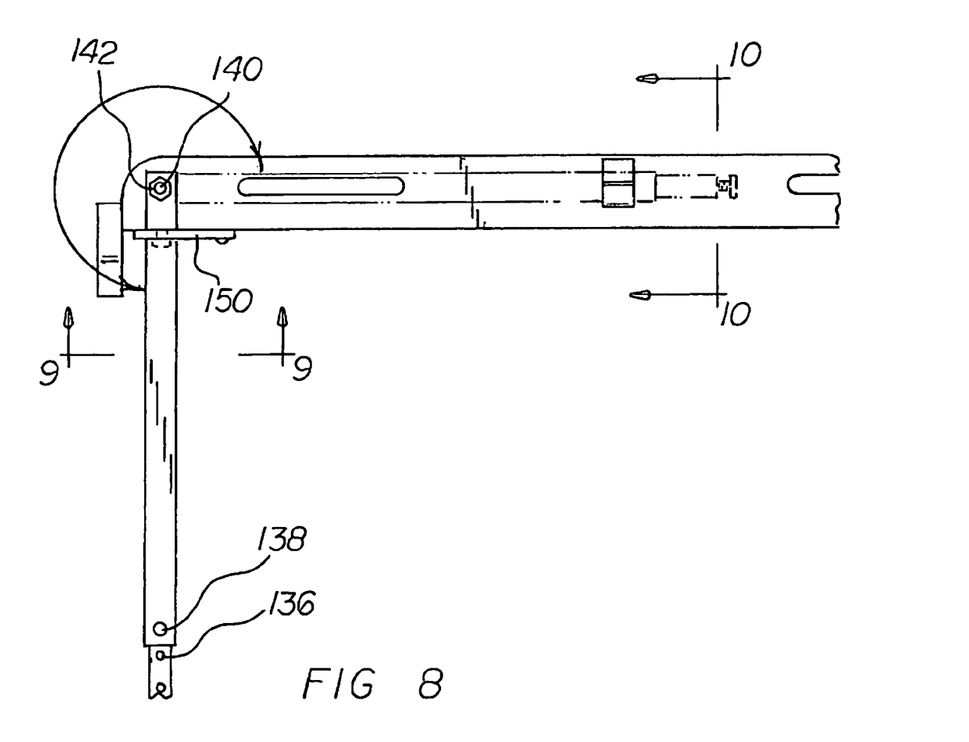
FIG. 8 is a view taken along line 8-8 of FIG. 7.

Next provided is a pair of telescoping legs 130. In the preferred embodiment each of the telescoping legs has a generally square tubular configuration, though, in other embodiments the telescoping legs may have some other geometric configuration or cross-section profile.

Each leg has a first upper portion 132 having a first internal dimension and a first length. Each leg also has a second lower portion 134 having a second external dimension and a second length. The first dimension is larger than the second dimension. The first length is longer than the second length. This configuration allows the second lower portion to fit into, and to be received by, the first upper portion and therefore "telescope".

Each of the second lower portions of the legs has a plurality of adjustment holes 136 along its length. The first upper portion has an adjustment detent 138 sized to mate with and hold the adjustment holes of the lower portion thereby allowing adjustment in overall length of the combined upper and lower portions when coupled.

The first upper portion of each leg has a pivotable mounting aperture 140 there through. There is a mounting bolt 142 associated with each upper portion of the leg and the pivotable mounting aperture 144 of the upper portion of each leg.

Figure 9:
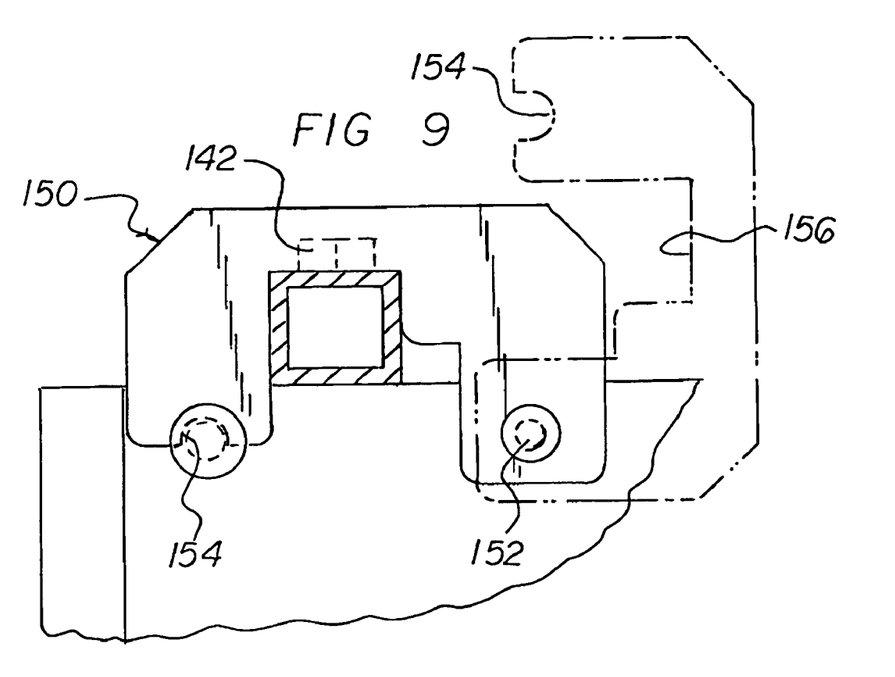
FIG. 9 is a view taken along line 9-9 of FIG. 8.

The upper portion of each leg has an associated leg lock 150. The leg lock has a generally C-shaped configuration. The leg lock has a pivoting hole 152 and a holding slot 154 there through. The leg lock has a recess 156 sized to receive and mate with the outside dimension of the first upper portion of the leg and to hold the leg in a downward ground-engaging position.

Figure 10:
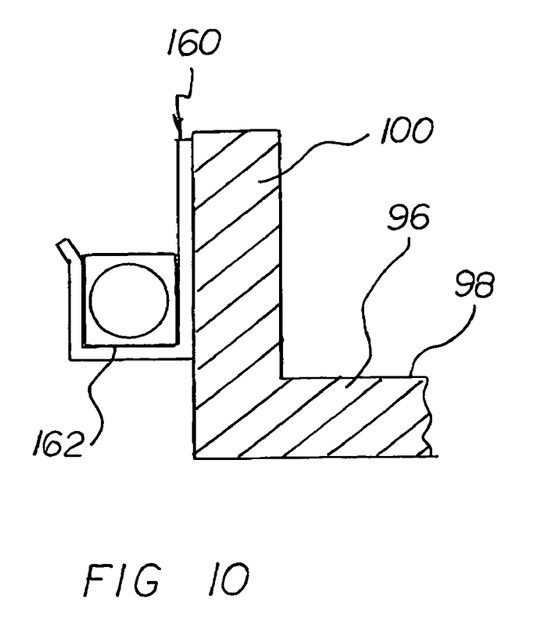
FIG. 10 is a view taken along line 10-10 of FIG. 8.

Lastly provided is a leg holder 160. A leg holder is associated with each leg. The leg holder has a generally square, C-shaped configuration with a recess 162. The internal dimension of the recess is larger than the first external dimension of the upper portion of the telescoping leg so as to allow the leg to be nested within the leg holder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle cargo slide system comprising:
   a vehicle having a forward end and a rearward end, the vehicle also having a cargo bay comprising a floor having a forward portion and a rearward portion;
   a forward cross-member being coupled to the floor of the cargo bay at the forward portion of the cargo bay;
   at least one side member running from the forward floor of the cargo bay to the rearward floor of the cargo bay of the vehicle with the side member having at least one attachment point;
   a rearward cross-member comprising a length and having an rearward edge and a forward edge with a width there between;
   at least one coupling strap having a length with an inward end and an outward end;
   a platform having a generally rectilinear configuration with the platform being coupled to the side member.

2. The vehicle cargo slide system as described in claim 1 wherein the system further comprises;
   a lock attachment tab being associated with the rearward member, the rearward member further comprising a pair of tab mounting holes there through, the lock attachment tab having a generally L-shaped configuration with the shorter lower horizontal leg of the "L" having a pair of mounting holes there through and the perpendicular longer upright leg of the "L" having a lock bolt hole there through;
   a lock having a first component and a second component, with the first lock component being coupled to the lock attachment tab.

3. The vehicle cargo slide system as described in claim 1 wherein the forward cross-member comprises a rearward side and a forward side with a thickness there between, the cross-member having a generally L shaped configuration, the cross-member also having a plurality of attachment points.

4. The vehicle cargo slide system as described in claim 1 wherein the side member comprises at least one attachment point, the side member having a generally C-shaped configuration with a top and a bottom, the configuration allowing the side member to mate with and hold and contain an associated telescoping and extending weight-bearing rail with the side member also having a weight-bearing rail stop located at the rearward end of the side member.

5. The vehicle cargo slide system as described in claim 1 wherein the coupling strap comprises a hook at the inward end and an associated D ring and mounting tab located at the outward end of each of the straps, the hook sized and configured to be received by and mated with the attachment slot of the side member.

6. The vehicle cargo slide system as described in claim 1 wherein the rearward cross-member comprises a generally rectilinear shaped configuration with a pair of locking point attachment apertures located near the center of the length of the rearward cross-member.

7. The vehicle cargo slide system as described in claim 1 wherein the platform further comprises a forward edge and a rearward edge and two parallel side edges, the platform having an upper surface and a lower surface and a thickness there between, the upper surface comprising a contact surface and the lower surface comprising a mounting surface.

8. The vehicle cargo slide system as described in claim 7 wherein the upper surface of the platform further comprises an upwardly projecting peripheral rim coupled to the side edges and the forward edge of the platform, the lower surface of the platform further comprising a downwardly projecting rim along the rearward edge of the platform with the downwardly projecting rim having a length and a lock aperture located near the center of the length of the downwardly projecting rim.

9. The vehicle cargo slide system as described in claim 8 wherein the system further comprises a second lock component being coupled to the lock aperture of the downwardly projecting rim of the platform, the second lock component being configured to be received by and mated with a first lock component that is coupled to a lock attachment tab coupled to the rearward member, thereby allowing a user to lock the platform in place.

10. The vehicle cargo slide system as described in claim 4 wherein the system further comprises a platform attachment bracket having an inverted L-shaped configuration with the short horizontal leg of the L being located above the longer perpendicular and downwardly displaced leg of the L, the horizontal leg being configured to be coupled to the mounting surface of the platform and the downwardly displaced leg of the L being configured to be coupled to a weight-bearing rail.

11. The vehicle cargo slide system as described in claim 1 wherein the system further comprises at least one leg.

12. The vehicle cargo slide system as described in claim 11 wherein the leg has an adjustable length and an associated leg lock.

13. The vehicle cargo slide system as described in claim 1 wherein the system further comprises a plurality of legs with each leg having a generally square tubular configuration with a first upper portion having a first internal dimension and a first length and a second lower portion having a second external dimension and a second length with the first dimension being larger than the second dimension and the first length being longer than the second length so that the second lower portion fits into and is received by the first upper portion, the second lower portion of each leg having a plurality of adjustment holes along its length, the first upper portion of each leg having an adjustment detent sized to mate with and hold the adjustment holes of the lower portion thereby allowing adjustment in overall length of the upper and lower portions when coupled, the first upper portion of each leg having a pivotable mounting aperture there through with an associated mounting bolt, the upper portion having an associated leg lock, the leg lock having a generally C-shaped configuration with a pivoting hole and a holding slot therein, the leg lock having a recess sized to receive and mate with the outside dimension of the first upper portion of the leg and to hold the leg in a downward ground-engaging position; and     a leg holder being associated with each leg, the leg holder having a generally square C-shaped configuration with an internal dimension being larger than the first external dimension of the upper portion of the telescoping leg so as to allow the leg to be nested within the leg holder.

14. A vehicle cargo slide system comprising:

a vehicle having a forward end and a rearward end, the vehicle also having a cargo bay comprising a floor having a forward portion and a rearward portion;

a forward cross-member having an rearward side and a forward side with a thickness there between, the cross-member having a generally L shaped configuration, the cross-member also having a plurality of attachment points, the forward cross-member being coupled to the floor of the cargo bay at the forward portion of the cargo bay;

a pair of side members, each of the side members running in parallel with each other from the forward floor of the cargo bay to the rearward floor of the cargo bay of the vehicle with each of the side members having at least one attachment point slot, each of the side members having a generally C-shaped configuration with a top and a bottom, the configuration allowing the side members to mate with and hold and contain an associated telescoping and extending weight-bearing rail with each of the side members also having a weight-bearing rail stop located at the rearward end of each of the side members;

a plurality of coupling straps, each of the straps having a length with an inward end and an outward end, each of the straps having a hook at the inward end and an associated D ring and mounting tab located at the outward end of each of the straps, the hook sized and configured to be received by and mate with the attachment slot of the side member;

a rearward cross-member comprising a length and having an rearward edge and a forward edge with a width there between, the rearward cross-member having a generally rectilinear shaped configuration with a pair of tab mounting holes located near the center of the length of the rearward cross-member;

a lock attachment tab having a generally L-shaped configuration with the shorter lower horizontal leg of the "L" having a pair of tab mounting holes there through and the perpendicular longer upright leg of the "L" having a lock mounting aperture there through;

a lock having two components with the first lock component being coupled to the lock attachment tab;

a platform having a generally rectilinear configuration with a forward edge and a rearward edge and two parallel side edges, the platform having an upper surface and a lower surface and a thickness there between, the upper surface comprising a contact surface and the lower surface comprising a mounting surface, the upper surface having an upwardly projecting peripheral rim coupled to the side edges and the forward edge of the platform, the lower surface having a downwardly projecting rim along the rearward edge of the platform with the downwardly projecting rim having a length and a lock aperture located near the center of the length of the downwardly projecting rim;

a second lock component being coupled to the lock aperture of the downwardly projecting rim of the platform, the second lock component being configured to be received by and mated with the first lock component that is coupled to the lock attachment tab thereby allowing a user to lock the platform in place;

a pair of platform attachment brackets with each bracket having an inverted L-shaped configuration with the short horizontal leg of the L being located above the longer perpendicular and downwardly displaced leg of the L, each of the horizontal legs being configured to be coupled to the mounting surface of the platform and each of the downwardly displaced legs of the L being configured to be coupled with one of the weight-bearing rails;

a pair of telescoping legs, the legs having a generally square tubular configuration with a first upper portion having a first internal dimension and a first length and a second lower portion having a second external dimension and a second length with the first dimension being larger than the second dimension and the first length being longer than the second length so that the second lower portion fits into and is received by the first upper portion, the second lower portion having a plurality of adjustment holes along its length, the first upper portion having an adjustment detent sized to mate with and hold the adjustment holes of the lower portion thereby allowing adjustment in overall length of the upper and lower portions when coupled, the first upper portion having a pivotable mounting aperture there through with an associated mounting bolt, the upper portion having an associated leg lock, the leg lock having a generally C-shaped configuration with a pivoting hole and a holding slot therein, the leg lock having a recess sized to receive and mate with the outside dimension of the first upper portion of the leg and to hold the leg in a downward ground-engaging position; and a leg holder being associated with each leg, the leg holder having a generally square C-shaped configuration with a recess, the recess internal dimension being larger than the first external dimension of the upper portion of the telescoping leg so as to allow the leg to be nested within the leg holder.

\* \* \* \* \*